(12) United States Patent
Sheath

(10) Patent No.: US 6,370,376 B1
(45) Date of Patent: Apr. 9, 2002

(54) COMPUTER CELLULAR COMMUNICATION SYSTEM

(76) Inventor: David J. Sheath, Davlyn House, 46 Downs Way, Great Bookham Surrey (GB), KT23 4BW ( * ) Notice: Subject to any disclaimer, the term of this patent is extended or adjusted under 35 U.S.C. 154(b) by 0 days.

(21) Appl. No.: 09/271,856

(22) Filed: Mar. 18, 1999

(51) Int. Cl.[7] .................................................. H04Q 7/20
(52) U.S. Cl. ...................................... 455/426; 455/557
(58) Field of Search ................................. 455/557, 556, 455/558, 575, 551, 552, 426, 442

(56) References Cited

U.S. PATENT DOCUMENTS

| | | | |
|---|---|---|---|
| 5,163,086 A | * 11/1992 | Ahearn et al. ................. | 379/91 |
| 5,373,300 A | * 12/1994 | Jennes et al. ................. | 343/102 |
| 5,828,341 A | * 10/1998 | Delamater ................... | 343/702 |
| 5,907,815 A | *  5/1999 | Grimm et al. ............... | 455/557 |
| 6,016,432 A | *  1/2000 | Stein .......................... | 455/557 |
| 6,035,214 A | *  3/2000 | Henderson .................. | 455/556 |
| 6,119,179 A | *  9/2000 | Whitridge et al. ............ | 710/72 |

\* cited by examiner

*Primary Examiner*—Vivian Chang
*Assistant Examiner*—N. Mehrpour

(57) ABSTRACT

A computer cellular communication system is provided including a computer having a communication jack adapted for being releasably connected to a hard line communication network and a motherboard mounted within the computer. The motherboard has mounted thereon read only memory, random access memory, and a central processing unit connected to the read only memory and the random access memory. Also included is a cellular communication module mounted directly on the motherboard and including a cellular transmitter for transmitting data in free space and a cellular receiver connected to the first communication jack of the portable computer for receiving data in free space. The cellular communication module further includes a first modem connected to the cellular transmitter and the cellular receiver for communicating data therewith. The first modem generates a receive signal upon the receipt of a call signal via free space having a predetermined associated cellular telephone number. The cellular communication module further includes a second modem connected to the communication jack of the portable computer for communicating data with the hard line communication network. The second modem also generates the receive signal upon the receipt of a call signal via the hard line communication network. The cellular communication module also has a cellular communications processor connected to the first modem and the second modem and further connected to the central processing unit for communicating data with the central processing unit upon the actuation thereof.

6 Claims, 3 Drawing Sheets

COMPUTER CELLULAR COMMUNICATION SYSTEM

BACKGROUND OF THE INVENTION

1. Field of the Invention

The present invention relates to computer systems and more particularly pertains to a new computer cellular communication system for providing an instant indication of the receipt of a message received from a source such as the Internet via a cellular or land line link.

2. Description of the Prior Art

The use of computer systems is known in the prior art. More specifically, computer systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,361,061; 5,138,328; 5,550,861; 5,610,941; U.S. Pat. No. Des. 368,911; and U.S. Pat. No. 5,644,320.

In these respects, the computer cellular communication system according to the present invention substantially departs from the conventional concepts and designs of the prior art, and in so doing provides an apparatus primarily developed for the purpose of providing an instant indication of the receipt of a message received from a source such as the Internet via a cellular or land line link.

SUMMARY OF THE INVENTION

In view of the foregoing disadvantages inherent in the known types of computer systems now present in the prior art, the present invention provides a new computer cellular communication system construction wherein the same can be utilized for providing an instant indication of the receipt of a message received from a source such as the Internet via a cellular or land line link.

The general purpose of the present invention, which will be described subsequently in greater detail, is to provide a new computer cellular communication system apparatus and method which has many of the advantages of the computer systems mentioned heretofore and many novel features that result in a new computer cellular communication system which is not anticipated, rendered obvious, suggested, or even implied by any of the prior art computer systems, either alone or in any combination thereof.

To attain this, the present invention is adapted for use with a computer service provider having a server connected to a hard line communication network for communicating data thereon. Associated therewith is a cellular provider connected to the hard line communication network for communicating data with the computer service provider and further transmitting and receiving the data via free space. The present invention includes a portable computer including a base portion having a top face, a bottom face, and a thin periphery formed therebetween. As shown in FIG. 1, the periphery of the base portion is defined by a rear face, a front face and a pair of side faces. The top face of the base portion has a keyboard mounted thereon. The rear face of the base portion has a pair of communication jacks mounted thereon adjacent to a first one of the side faces of the base portion of the portable computer. Such communication jacks include a first communication jack and a second communication jack. The second communication jack is adapted for being releasably connected to the hard line communication network. The rear face further includes a recharging jack releasably connected to a power source for receiving power therefrom. For reasons that will soon become apparent, the first side face has an access port formed therein. With continuing reference to FIG. 1, the portable computer further includes a display portion with a display mounted thereon being hingably coupled to the base portion. A motherboard is mounted within the base portion adjacent to one of the side faces and the rear face of the base portion of the portable computer. As shown in FIG. 2, the motherboard has mounted thereon read only memory, random access memory, a hard disk drive, and a central processing unit. As shown, the central processing unit is connected to the read only memory, the random access memory, the hard disk drive, and a primary battery module. Ideally, the primary battery module is removably mounted on the base portion. Further, the central processing unit is adapted to actuate upon the receipt of an activation signal. Also included is a memory card removably connected to the access port of the computer. For reasons that will soon become apparent, the memory card has user communication data stored thereon including a cellular telephone number, a billing rate, and an identification code. For communicating with the cellular provider, an antenna is removably coupled to the first communication jack of the base portion of the portable computer. As shown in FIG. 3, a cellular communication module is mounted directly on the motherboard adjacent to the first side face of the base portion of the portable computer. As shown in FIG. 4, the cellular communication module includes a cellular transmitter connected to the first communication jack of the portable computer for transmitting data in free space via the antenna. Associated therewith is a cellular receiver connected to the first communication jack of the portable computer for receiving data in free space via the antenna. Connected to the cellular transmitter and the cellular receiver is a first modem for communicating data therewith. The first modem is connected to the access port of the portable computer for reading the user communication data on the memory card. In use, the first modem generates a receive signal upon the receipt of a call signal via free space having an associated cellular telephone number which matches that stored on the memory module. In addition, the first modem serves to store billing information on the memory module that is received via free space. With continuing reference to FIG. 4, the cellular communication module further includes a second modem connected to the second communication jack of the portable computer for communicating data with the hard line communication network. Similar to the first modem, the second modem generates the receive signal upon the receipt of a call signal via the hard line communication network. For power purposes, the cellular communication module further includes an auxiliary rechargeable battery connected to the recharging jack of the portable computer for recharging upon the receipt of power. In use, the auxiliary rechargeable battery is relied upon to provide continuous power to the cellular communication module. Finally, the cellular communication module has a cellular communications processor connected to the first modem and the second modem. The cellular communications processor is further connected to the central processing unit for transmitting the activation signal thereto upon the receipt of the receive signal from at least one of the modems. The cellular communications processor further serves to communicate data with the central processing unit upon the actuation thereof. As set forth hereinabove, the cellular communications processor is connected to the auxiliary battery for receiving power therefrom.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new computer cellular communication system apparatus and method which has many of the advantages of the computer systems mentioned heretofore and many novel features that result in a new computer cellular communication system which is not anticipated, rendered obvious, suggested, or even implied by any of the prior art computer systems, either alone or in any combination thereof.

It is another object of the present invention to provide a new computer cellular communication system which may be easily and efficiently manufactured and marketed.

It is a further object of the present invention to provide a new computer cellular communication system which is of a durable and reliable construction.

An even further object of the present invention is to provide a new computer cellular communication system which is susceptible of a low cost of manufacture with regard to both materials and labor, and which accordingly is then susceptible of low prices of sale to the consuming public, thereby making such computer cellular communication system economically available to the buying public.

Still yet another object of the present invention is to provide a new computer cellular communication system which provides in the apparatuses and methods of the prior art some of the advantages thereof, while simultaneously overcoming some of the disadvantages normally associated therewith.

Still another object of the present invention is to provide a new computer cellular communication system for providing an instant indication of the receipt of a message received from a source such as the Internet via a cellular or land line link.

Even still another object of the present invention is to provide a new computer cellular communication system that includes a computer having a communication jack adapted for being releasably connected to a hard line communication network and a motherboard mounted within the computer. The motherboard has mounted thereon read only memory, random access memory, and a central processing unit connected to the read only memory and the random access memory. Also included is a cellular communication module mounted directly on the motherboard and including a cellular transmitter for transmitting data in free space and a cellular receiver connected to the first communication jack of the portable computer for receiving data in free space. The cellular communication module further includes a first modem connected to the cellular transmitter and the cellular receiver for communicating data therewith. The first modem generates a receive signal upon the receipt of a call signal via free space having a predetermined associated cellular telephone number. The cellular communication module further includes a second modem connected to the communication jack of the portable computer for communicating data with the hard line communication network. The second modem also generates the receive signal upon the receipt of a call signal via the hard line communication network. The cellular communication module also has a cellular communications processor connected to the first modem and the second modem and further connected to the central processing unit for communicating data with the central processing unit upon the actuation thereof.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
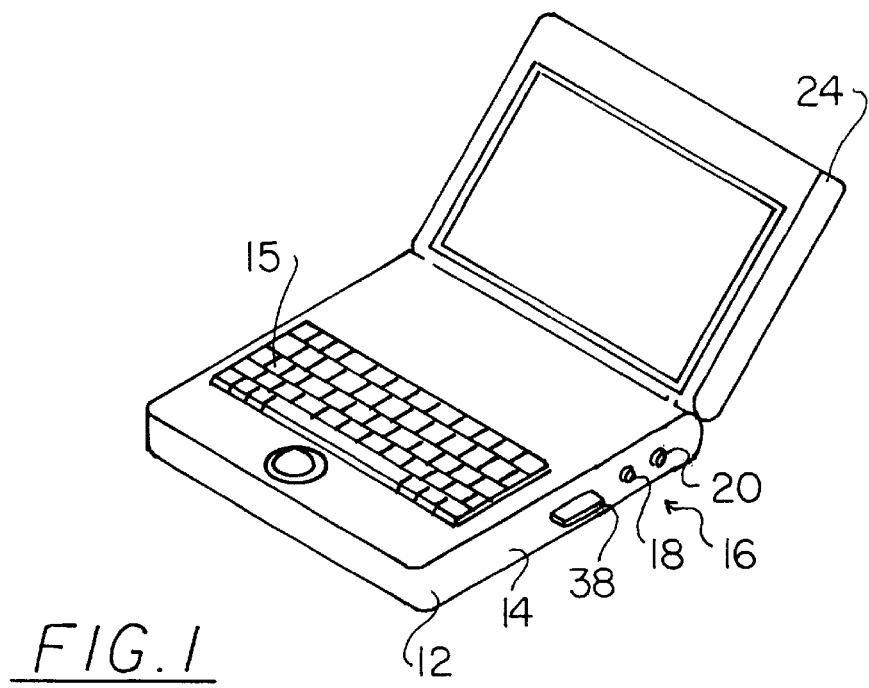
FIG. 1 is a perspective view of a new computer cellular communication system according to the present invention.

With reference now to the drawings, and in particular to FIGS. 1 through 4 thereof, a new computer cellular communication system embodying the principles and concepts of the present invention and generally designated by the reference numeral 10 will be described.

The present invention, designated as numeral 10, is adapted for use with a computer service provider (not shown) having a server connected to a hard line communication network for communicating data thereon. Such server is adapted to automatically dial up a telephone number associated with a user upon the receipt of a string of packets with an identification header assigned to the user. Upon connection with such user, the string of packets is automatically delivered or delivered per a predetermined schedule. A ROM look-up table may be employed to dial up the appropriate number associated with the user for whom the string of packets is meant. Termination of the call to the user is preferably effected upon successful delivery of the string of packets.

Associated therewith is a cellular provider (not shown) connected to the hard line communication network for communicating data with the computer service provider and further transmitting and receiving the data via free space.

The present invention includes a desk top or portable computer 12 including a base portion 14 having a top face, a bottom face, and a thin periphery formed therebetween. As shown in FIG. 1, the periphery of the base portion is defined by a rear face, a front face and a pair of side faces. The top face of the base portion has a keyboard 15 mounted thereon. The rear face of the base portion has a pair of communication jacks 16 mounted thereon adjacent to a first one of the side faces of the base portion of the portable computer. Such communication jacks include a first communication jack 18 and a second communication jack 20. The second communication jack is adapted for being releasably connected to the hard line communication network. The rear face further includes a recharging jack 22 releasably connected to a power source for receiving power therefrom. For reasons that will soon become apparent, the first side face has an access port formed therein.

Figure 2:
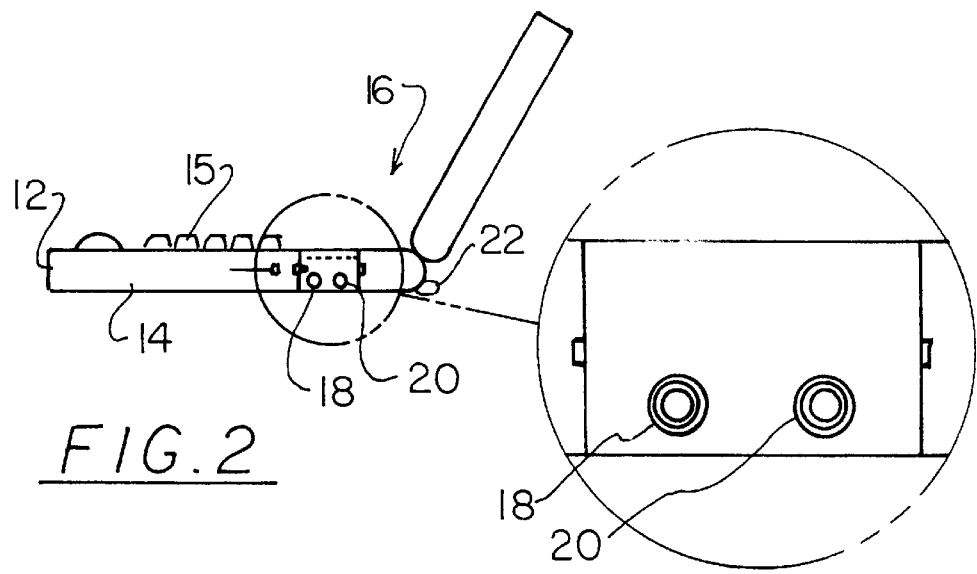
FIG. 2 is a side view of the present invention.

With continuing reference to FIG. 1, the portable computer further includes a display portion 24 with a display mounted thereon being hingably coupled to the base portion. A motherboard 26 is mounted within the base portion adjacent to one of the side faces and the rear face of the base portion of the portable computer. As shown in FIG. 2, the motherboard has mounted thereon read only memory 28, random access memory 30, a hard disk drive 32, and a central processing unit 34. As shown, the central processing unit is connected to the read only memory, the random access memory, a hard disk drive, and a primary battery module 36. Ideally, the primary battery module is removably mounted on the base portion. In use, the central processing unit is adapted to actuate upon the receipt of an activation signal. What constitutes actuation of the central processing unit will be set forth hereinafter.

Also included is a SIMS memory card 38 removably connected to the access port of the computer. For reasons that will soon become apparent, the memory card has user communication data stored thereon including a cellular telephone number, a billing rate, and an identification code. For communicating with the cellular provider, an antenna is removably coupled to the first communication jack of the base portion of the portable computer. Such antenna preferably includes a pair of coupled insulated strands of a copper with a plug for removable insertion within the first communication jack.

Figure 3:
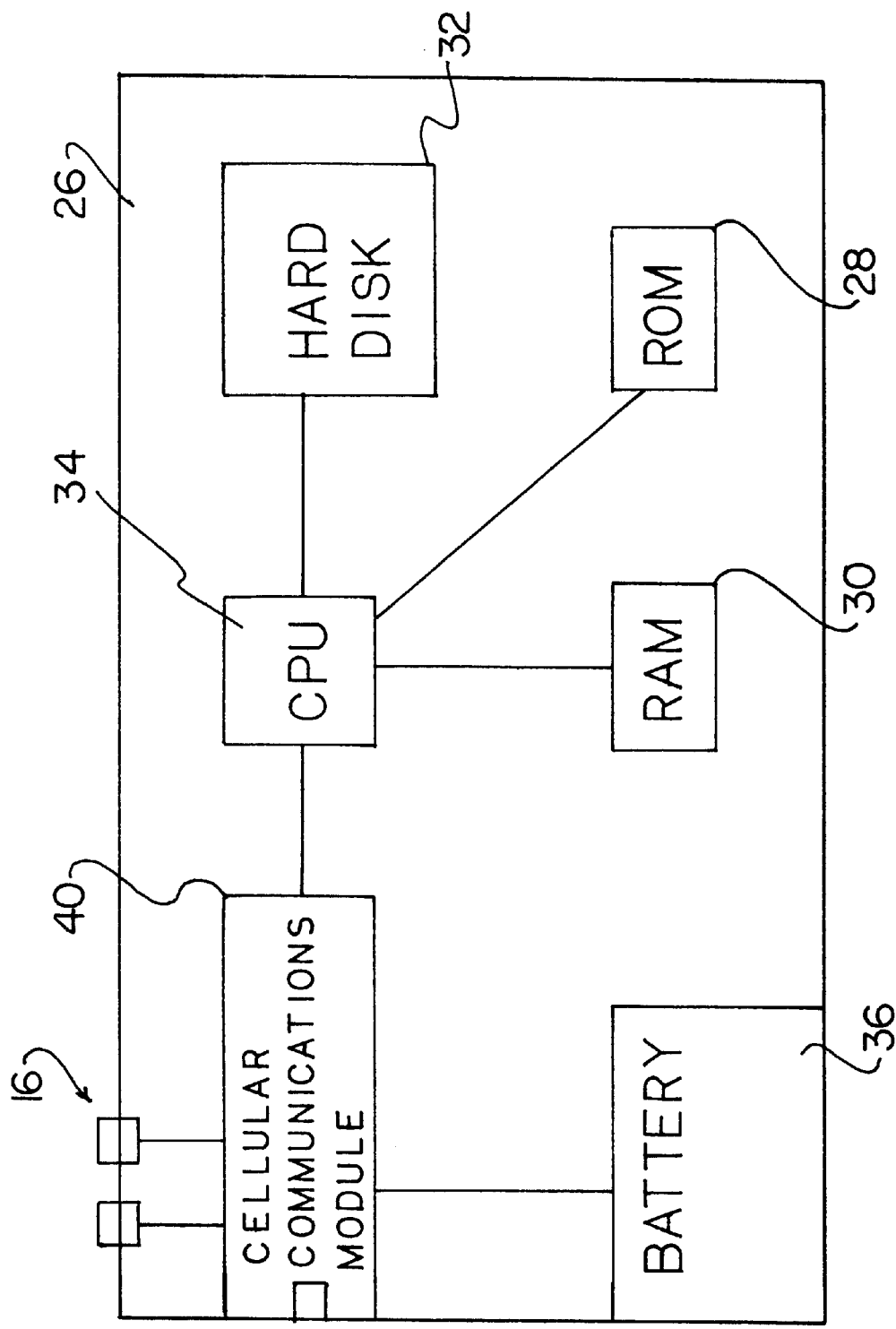
FIG. 3 is a schematic diagram of the motherboard of the present invention.
Figure 4:
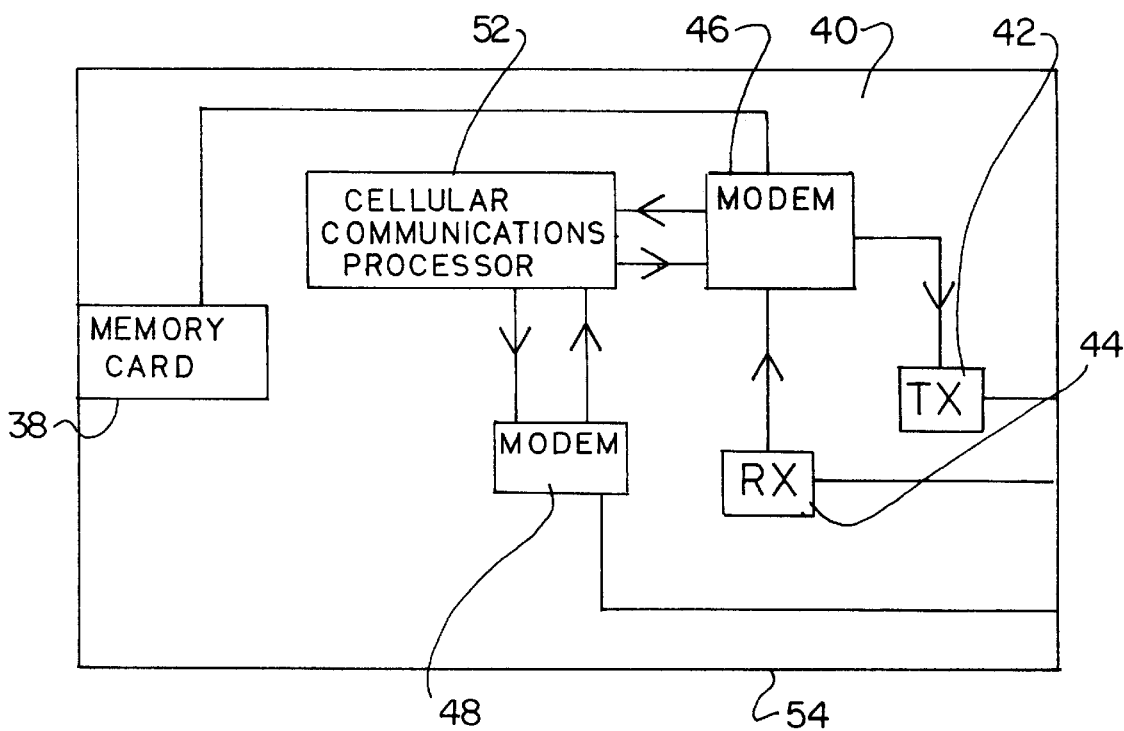
FIG. 4 is a schematic diagram of the cellular communication module of the present invention.

As shown in FIG. 3, a cellular communication module 40 is mounted directly on the motherboard adjacent to the first side face of the base portion of the portable computer. As shown in FIG. 4, the cellular communication module includes a cellular transmitter 42 connected to the first communication jack of the portable computer for transmitting data in free space via the antenna. Associated therewith is a cellular receiver 44 connected to the first communication jack of the portable computer for receiving data in free space via the antenna. Connected to the cellular transmitter and the cellular receiver is a first modem 46 for communicating data therewith. The first modem is connected to the access port of the portable computer for reading the user communication data on the memory card.

In use, the first modem generates a receive signal upon the receipt of a call signal via free space having an associated cellular telephone number which matches that stored on the memory module. In addition, the first modem serves to store billing information on the memory module that is received via free space. Ideally, such billing information may be accessed via the computer.

With continuing reference to FIG. 4, the cellular communication module further includes a second modem 48 connected to the second communication jack of the portable computer for communicating data with the hard line communication network. Similar to the first modem, the second modem generates the receive signal upon the receipt of a call signal via the hard line communication network.

For power purposes, the cellular communication module further includes an auxiliary rechargeable battery(not shown) connected to the recharging jack of the portable computer for recharging upon the receipt of power. In use, the auxiliary rechargeable battery is relied upon to provide continuous power to the cellular communication module. In the preferred embodiment, the method by which the auxiliary battery is charged via the recharging jack is governed by software that recharges the battery when a level thereof reaches a low level.

Finally, the cellular communication module has a cellular communications processor 52 connected to the first modem and the second modem. The cellular communications processor is further connected to the central processing unit for transmitting the activation signal thereto upon the receipt of the receive signal from at least one of the modems. By this signal, the central processing unit and the computer is automatically powered up. Ideally, the computer service provider is adapted to stall a predetermined amount of time upon an acknowledgment of the receipt of the call signal in order to allow time for the computer to boot up after actuation.

Distinction should be made between powering up by way of the activation signal and simply manually actuating the central processing unit. Ideally, the central processing unit is governed by software that immediate effects the execution of electronic mail management software and immediate communication with the cellular communication module for receiving data therefrom. Such software preferably provides an audible or visual indication that the activation signal has been received once the computer has been booted up. Once the cellular communications processor receives packets via one of the modems, a subsequent response, if initiated, is automatically accomplished via the same modem. A manual override may be provided to allow the user to select which modem to use if desired.

For shielding the cellular communications processor and the related components from electromagnetic radiation generated by the remaining components of the computer, a magnetic shield 54 is situated within the base portion of the portable computer. Ideally, the magnetic shield is positioned over the cellular communication module with the remaining components of the motherboard being exterior of the magnetic shield. While a portable laptop computer has been set forth hereinabove, it should be noted that any type of computer may be constructed employing the principles set forth. Further options also include a headset for allowing use of the cellular capabilities of the present in a conventional manner.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A computer cellular communication system comprising, in combination:

a computer service provider including a server connected to a hard line communication network for communicating data thereon, the computer service provider adapted to automatically dial up a telephone number associated with a user upon the receipt of a string of packets with an identification header corresponding to the user;

a cellular provider connected to the hard line communication network for communicating data with the computer service provider and further transmitting and receiving the data via free space;

a computer including a base portion having a top face, a bottom face, and a thin periphery formed therebetween defined by a rear face, a front face and a pair of side faces, the top face of the base portion having a keyboard mounted thereon, the rear face of the base portion having a pair of communication jacks mounted thereon adjacent to a first one of the side faces of the base portion of the computer and including a first communication jack and a second communication jack releasably connected to the hard line communication network, the rear face further including a recharging jack releasably connected to a power source for receiving power therefrom, the first side face having an access port formed therein, the computer further including a display portion with a display mounted thereon being hingably coupled to the base portion, a motherboard mounted within the base portion adjacent to one of the side faces and the rear face of the base portion of the computer, the motherboard having mounted thereon read only memory, random access memory, a hard disk drive, and a central processing unit connected to the read only memory, the random access memory, the hard disk drive, and a primary battery module removably mounted on the base portion, wherein the central processing unit is adapted to actuate upon the receipt of an activation signal;

a memory card removably connected to the access port of the computer and having user communication data stored thereon including a cellular telephone number, a billing rate, and an identification code;

an antenna removably coupled to the first communication jack of the base portion of the computer for communicating with the cellular provider;

a cellular communication module mounted directly on the motherboard adjacent to the first side face of the base portion of the computer, the cellular communication module including a cellular transmitter connected to the first communication jack of the computer for transmitting data in free space via the antenna, a cellular receiver connected to the first communication jack of the computer for receiving data in free space via the antenna, and a first modem connected to the cellular transmitter and the cellular receiver for communicating data therewith, the first modem connected to the access port of the computer for reading the user communication data on the memory card, wherein the first modem generates a receive signal upon the receipt of a call signal via free space having an associated cellular telephone number which matches that stored on the memory module and the first modem further adapted to store billing information on the memory module that is received via free space;

said cellular communication module further including a second modem connected to the second communication jack of the computer for communicating data with the hard line communication network, wherein the second modem generates the receive signal upon the receipt of a call signal via the hard line communication network;

said cellular communication module further including an auxiliary rechargeable battery connected to the recharging jack of the computer for recharging upon the receipt of power;

said cellular communication module further including a cellular communications processor connected to the first modem and the second modem and further connected to the central processing unit for transmitting the activation signal thereto upon the receipt of the receive signal from at least one of the modems and further communicating data with the central processing unit upon the actuation thereof, wherein the cellular communications processor is connected to the auxiliary battery for receiving power therefrom; and a magnetic shield situated within the base portion of the computer and positioned over cellular communication module with the motherboard being exterior of the magnetic shield.

2. A computer cellular communication system comprising:

a computer including a communication jack adapted for being releasably connected to a hard line communication network and a motherboard mounted within the computer, the motherboard having mounted thereon read only memory, random access memory, and a central processing unit connected to the read only memory and the random access memory;

a cellular communication module mounted directly on the motherboard and including a cellular transmitter for transmitting data in free space, a cellular receiver for receiving data in free space, and a first modem connected to the cellular transmitter and the cellular receiver for communicating data therewith, wherein the first modem generates a receive signal upon the receipt of a call signal via free space having a predetermined associated cellular telephone number;

said cellular communication module further including a second modem connected to the communication jack of the computer for communicating data with the hard line communication network, wherein the second modem generates the receive signal upon the receipt of a call signal via the hard line communication network;

said cellular communication module further including a cellular communications processor connected to the first modem and the second modem and further connected to the central processing unit for communicating data with the central processing unit;

a memory card removably connected to an access port of the motherboard and having user communication data stored thereon including a cellular telephone number and a billing rate, wherein the first modem is connected to the access port of the computer for reading the user communication data from the memory card; and wherein the first modem is further adapted to store billing information on the memory module that is received via free space.

3. A computer cellular communication system as set forth in claim 2 wherein the cellular communication module further includes an auxiliary rechargeable battery connected to a recharging jack of the computer for recharging upon the receipt of power.

4. A computer cellular communication system as set forth in claim 2 wherein the central processing unit is adapted to actuate upon the receipt of an activation signal, wherein said cellular communications processor is adapted for transmitting the activation signal to the central processing unit upon the receipt of the receive signal from at least one of the modems and further communicating data with the central processing unit upon the actuation thereof.

5. A computer cellular communication system as set forth in claim 2 and further including a magnetic shield situated within the computer and positioned over cellular communication module with remaining components of the motherboard being exterior of the magnetic shield.

6. A computer cellular communication system as set forth in claim 2 and further including another communication jack connected to the cellular transmitter and the cellular receiver for removably connecting with an antenna.

* * * * *